(12) United States Patent
Herman-Saffar et al.

(10) Patent No.: US 10,721,266 B1
(45) Date of Patent: Jul. 21, 2020

(54) AUTOMATED SECURITY INCIDENT REMEDIATION RECOMMENDER

(71) Applicant: EMC IP Holding Company LLC, Hopkinton, MA (US)

(72) Inventors: Or Herman-Saffar, Beer-Sheva (IL); Amihai Savir, Sansana (IL); Stephen Todd, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 220 days.

(21) Appl. No.: 15/797,496

(22) Filed: Oct. 30, 2017

(51) Int. Cl.
*H04L 29/00* (2006.01)
*H04L 29/06* (2006.01)

(52) U.S. Cl.
CPC ...... *H04L 63/1441* (2013.01); *H04L 63/1416* (2013.01)

(58) Field of Classification Search
CPC .. G06N 99/005; G06N 20/00; H04L 63/1416; H04L 63/1441; H04L 63/145; H04L 63/1425
See application file for complete search history.

(56) References Cited

U.S. PATENT DOCUMENTS

| | | | | |
|---|---|---|---|---|
| 5,678,002 A * | 10/1997 | Fawcett | ............. | G06F 11/0709 709/224 |
| 7,433,855 B2 * | 10/2008 | Gavan | ................... | H04J 3/175 379/111 |
| 7,529,679 B1 * | 5/2009 | Pomerance | ............. | G06Q 10/10 705/1.1 |
| 9,390,418 B2 * | 7/2016 | Gavan | ..................... | H04J 3/175 |
| 9,548,987 B1 * | 1/2017 | Poole | ................. | H04L 63/1408 |
| 9,654,485 B1 * | 5/2017 | Neumann | ........... | H04L 63/1416 |
| 10,198,780 B2 * | 2/2019 | Walker | ................. | G06Q 50/265 |
| 2004/0111305 A1 * | 6/2004 | Gavan | ..................... | H04J 3/175 706/47 |
| 2005/0050377 A1 * | 3/2005 | Chan | ................... | H04L 63/1433 714/4.3 |
| 2008/0270198 A1 * | 10/2008 | Graves | ............... | G06Q 10/0631 705/7.12 |
| 2009/0019314 A1 * | 1/2009 | Younger | ................. | H04L 41/00 714/37 |
| 2009/0129573 A1 * | 5/2009 | Gavan | ..................... | H04J 3/175 379/189 |
| 2010/0049646 A1 * | 2/2010 | Pechenik | ............... | G06Q 40/04 705/37 |

(Continued)

OTHER PUBLICATIONS

U.S. Appl. No. 14/863,783 filed in the name of Stephen Todd et al. Sep. 24, 2015, and entitled "Unstructured Data Valuation."

(Continued)

*Primary Examiner* — Don G Zhao
(74) *Attorney, Agent, or Firm* — Ryan, Mason & Lewis, LLP

(57) ABSTRACT

At least one security incident indicative of at least one security event that may impact or has impacted one or more assets associated with an organization is obtained. A remediation recommendation is automatically generated for the security incident based on one or more of: (i) one or more remediation processes associated with one or more security incidents that precede the at least one security incident in time; and (ii) one or more values attributed to the one or more assets of the organization.

20 Claims, 14 Drawing Sheets

(56) References Cited

U.S. PATENT DOCUMENTS

| | | | | |
|---|---|---|---|---|
| 2010/0125912 | A1* | 5/2010 | Greenshpon | G06F 21/577 726/25 |
| 2011/0239303 | A1* | 9/2011 | Owens, Jr. | H04L 63/20 726/25 |
| 2013/0318236 | A1* | 11/2013 | Coates | H04L 41/22 709/224 |
| 2017/0026401 | A1* | 1/2017 | Polyakov | H04L 63/1433 |
| 2017/0054605 | A1* | 2/2017 | Duncan | H04L 41/0686 |
| 2017/0126712 | A1* | 5/2017 | Crabtree | H04L 63/1425 |
| 2017/0237778 | A1* | 8/2017 | DiGiambattista | H04L 63/20 726/1 |
| 2017/0251013 | A1* | 8/2017 | Kirti | H04L 63/1408 |
| 2018/0020021 | A1* | 1/2018 | Gilmore | H04L 63/1408 |
| 2018/0048668 | A1* | 2/2018 | Gupta | H04L 63/1425 |
| 2018/0062941 | A1* | 3/2018 | Brown | H04L 41/5003 |
| 2018/0121035 | A1* | 5/2018 | Filippi | G06F 3/0482 |
| 2018/0121566 | A1* | 5/2018 | Filippi | G06T 11/206 |
| 2019/0122129 | A1* | 4/2019 | Alsubai | G06N 5/04 |
| 2019/0188797 | A1* | 6/2019 | Przechocki | G06N 20/00 |

OTHER PUBLICATIONS

U.S. Appl. No. 14/998,112 filed in the name of Stephen Todd et al. Dec. 24, 2015, and entitled "Data Valuation Based on Development and Deployment Velocity."

U.S. Appl. No. 15/135,790 filed in the name of Stephen Todd et al. Apr. 22, 2016, and entitled "Data Valuation at Content Ingest."

U.S. Appl. No. 15/135,817 filed in the name of Stephen Todd et al. Apr. 22, 2016, and entitled "Data Value Structures."

U.S. Appl. No. 15/136,327 filed in the name of Stephen Todd et al. Apr. 22, 2016, and entitled "Calculating Data Value via Data Protection Analytics."

U.S. Appl. No. 15/660,628 filed in the name of or Herman-Saffar et al. Jul. 26, 2017, and entitled "Automated Security Incident Ranking."

Stix, "Assets Affected in an Incident," http://stixproject.github.io/documentation/idioms/affected-assets/, 2017, 5 pages.

J.E. Short et al., "What's Your Data Worth?" MITSloan Management Review, Spring 2017, pp. 17-19, vol. 58, No. 3.

\* cited by examiner

| Incident | |
|---|---|
| ID | Identifier for the incident |
| Title | Title for the incident |
| Time | Time of incident discovery |
| Description | Description for the incident |
| Responder | Information about the responder for the incident |
| Affected assets | Characterize the particular assets affected during the incident |
| Impact assessment | Summary assessment of impact for the incident |
| Indicators | Characterize threat indicators related to the incident |
| Observables | Characterize cyber observables related to the incident |
| TTPs | Tactics, Techniques and procedures related to the incident |
| Related incidents | Identifies other incidents related to the current incident |
| COA | Course Of Action for the incident |
| History | Log of events or actions taken during handling the incident |

```
"vmlist":[{
    {@},
    {@},
    {@},
    {@
        "ip":"172.31.51.116",
        "ConnectedStorage":[{@}],
        "MemoryAllocated":@,
        "ProcessorAllocated":@,
        "Ports":[{@}],
        "RunningApplications":[{@}],
        "InstalledApplications":[{@
            {@ "Name":"Google Chrome",
                "version":"55.0.2003.87",
                "Location":"C:\Program Files (x86)\Google\Chrome\Application"
            },
            {@
                "Name":"Nmap 6.47",
                "version":null,
                "Location":null
            },
            {@
                "Name":"WinPcap 4.1.3",
                "version":"4.1.0.2980",
                "Location":null
            },
            {@
```

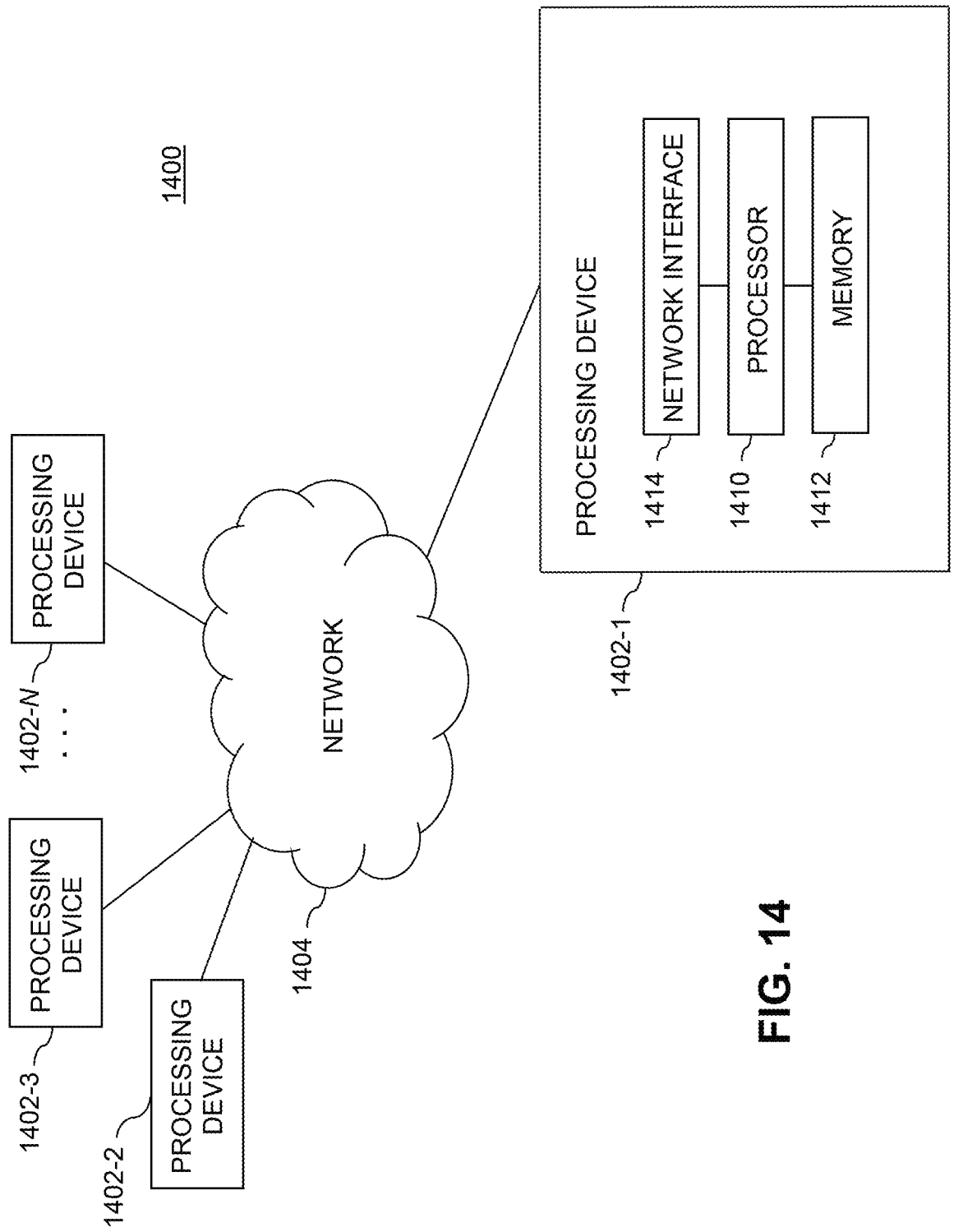

US 10,721,266 B1

AUTOMATED SECURITY INCIDENT REMEDIATION RECOMMENDER

FIELD

The field relates generally to information processing systems, and more particularly to cyber-security incident management techniques for use with such information processing systems.

BACKGROUND

A cyber-security incident is a violation or imminent threat of violation of security policies associated with the infrastructure of an organization. Such infrastructure may include, but is not limited to, information processing systems that the organization maintains or otherwise relies upon. Organizational attacks frequently compromise personal and business data, and it is critical to respond with a remediation procedure quickly and effectively when security breaches occur. Effective incident management helps personnel to minimize loss or theft of information and disruption of services caused by such incidents. However, nowadays, the selection of the appropriate remediation procedure is done manually and is highly dependent on a security incident response team and its expertise.

SUMMARY

Embodiments of the invention provide cyber-security incident management techniques using automated security incident remediation recommendation techniques.

For example, in one embodiment, an automated security incident remediation recommendation method comprises the following steps. At least one security incident indicative of at least one security event that may impact or has impacted one or more assets associated with an organization is obtained. A remediation recommendation is automatically generated for the security incident based on one or more of: (i) one or more remediation processes associated with one or more security incidents that precede the at least one security incident in time; and (ii) one or more values attributed to the one or more assets of the organization.

Additional embodiments perform one or more of the above steps in accordance with an apparatus or system comprising a processor and memory, and in accordance with an article of manufacture or computer program product.

Advantageously, a cyber-security threat assessment process according to an illustrative embodiment may automatically provide remediation recommendations for a current security incident based on the value of the data assets involved in the current security incident and one or more historical security incidents. In addition, feedback from the incident response team and appropriate organizational representation may be used to generate the remediation recommendation. As such, by automatically providing at least one remediation recommendation for the incident response team, the incident remediation process is more effective and efficient and provides strong protection for organizational systems and data.

These and other features and advantages of the invention will become more readily apparent from the accompanying drawings and the following detailed description.

BRIEF DESCRIPTION OF THE DRAWINGS

FIG. 10 illustrates an example of security incident characteristics utilized by a system and process for automated security incident remediation recommendation, according to an illustrative embodiment.

FIG. 12 illustrates an example of a file representation of organizational information utilized by a system and process for automated security incident remediation recommendation, according to an illustrative embodiment.

FIG. 14 illustrates a processing platform used to implement systems and methods for automatically generating remediation recommendations for security incidents, according to an illustrative embodiment.

DETAILED DESCRIPTION

Figure 1:
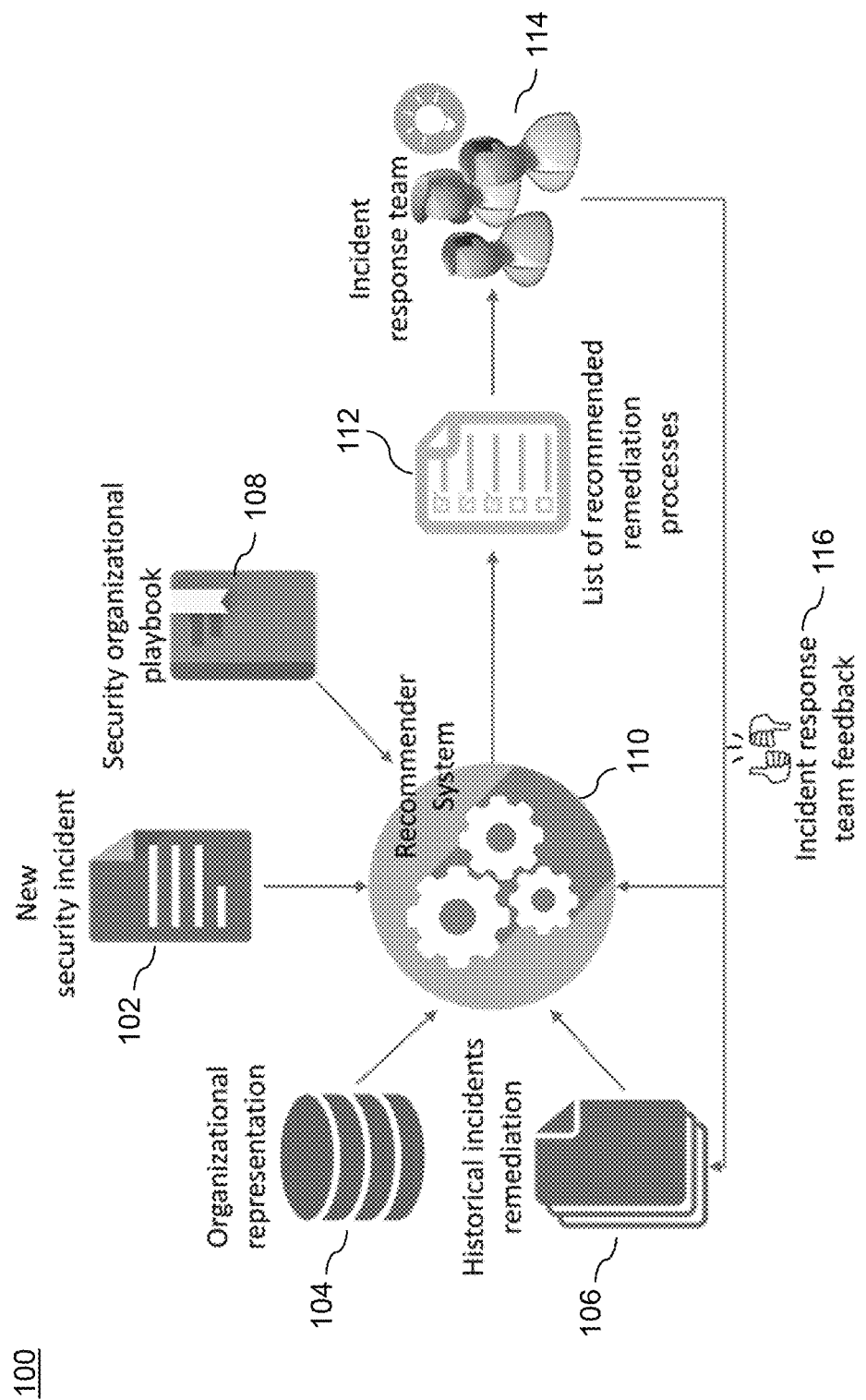
FIG. 1 illustrates a system and process for automated security incident remediation recommendation, according to an illustrative embodiment.

Illustrative embodiments will be described herein with reference to exemplary information processing systems and associated host devices, storage devices and other processing devices. It is to be appreciated, however, that embodiments are not restricted to use with the particular illustrative system and device configurations shown.

As mentioned above in the background, an organization exposed to cyber-security incidents is at risk for loss of data and disruption of services, both which can have a significant financial impact on the organization. The term "organization" as used herein is intended to be broadly construed, and may comprise, for example, a business or any other entity, group, person, enterprise, or multiples thereof. It is critical to respond with a remediation procedure quickly and effectively when security breaches occur. Fast incident remediation will minimize loss or theft of information and disruption of services caused by incidents.

As illustratively used herein, the term "remediation" refers to a post-incident or concurrent-incident repair of affected systems, communication and instruction to affected parties, and analysis that confirms the security threat has been or will soon be contained.

Illustrative embodiments provide a recommender system which, for a given current (new) security incident, automatically identifies and reports best practice incident remediation processes, based on historical similar incidents, value of data assets involved, and if needed, a security organizational playbook. Note that, as used herein, the terms "current" and "new" with respect to a security incident are used interchangeably, while a "historical" security incident is one that precedes the new or current security incident under consideration in time. The recommendation is specific and appropriate for the current security incident characteristic. Incident response team feedback can be used to assist with the remediation recommendation. The use of information gained during incident handling enables a better response to future incidents and thus provides stronger protection for systems and data.

It is realized herein that consideration of the value of the data assets across the organization is important for the security incident remediation process. When data assets are involved in a security incident, their value provides insight into the incident severity and therefore is important when determining the best remediation procedure for the incident.

Security incidents typically require an immediate response, but existing processes are predominantly manual, slow, and error-prone. In contrast, illustrative embodiments automatically provide the security response team with a recommendation list of relevant remediation processes, so that they are able to respond to the security incident immediately and protect the organization efficiently and effectively. It is to be appreciated that the incident response team may comprise at least one security incident responder.

Before describing illustrative embodiments in detail, various technical and conceptual problems with the existing manual incident remediation process performed by the incident response team are described below.

The incident response team typically receives information about security events and incidents from a Security Information and Event Management (STEM) product or tool, designed to help with security incident management. Such a SIEM product/tool serves as a security information stream or source, called a "security feed," to provide timely and actionable information about current security incidents. Other security feeds can be used to describe a current security incident. Nonetheless, when a security incident occurs, the incident response team should work quickly to analyze and validate each incident to determine the incident's scope and search for specific handling procedures and protocols related to the incident and its remediation. Performing this manual analysis is challenging, and with an increasing amount of security incidents, this manual process can be extremely time consuming.

It is realized herein that, in existing remediation approaches, historical security incidents are not taken into account effectively when handling current security incidents. It is further realized that historical security incidents and their remediation process could help the incident response team to decide on preferable remediation for the current incident and teach about its severity. With the ever-increasing number of new security incidents, the response team is not able to consider all past incidents when evaluating a new security incident. This prevents the incident response team from using information about past incidents to expand their knowledge about the current incident and decide on a remediation process.

It is further realized that the value of data assets is not taken into account while analyzing new security incidents. Security incident handling and the evaluation of its impact on the organization is often performed by individuals who have minimal knowledge about the business value of the incident's effect. Therefore, it is very difficult to consider the vulnerability of the organizational assets and to carefully protect the high-value data assets, especially when it comes to large organizations.

Deciding on the correct remediation process is challenging even when using a security playbook. Such a "security playbook" is an electronic file or record (or collection thereof) that contains descriptions of generic processes for handling specific security incidents, wherein each process is divided into several degrees of response severity. More generally, a security playbook comprises a set of generic remediation processes maintained by the organization. However, such a playbook does not consider value of data assets involved in the incident and does not include dynamic lessons learned from past security incidents. The remediation severity level of a new security incident is not provided by the playbook, and hence determined by the incident response team. However, the team does not always have the knowledge or capability to decide on the appropriate remediation process that fits the specific severity level.

Further, it is realized that determining a remediation process is sometimes a matter of interpretation. An analyst's perspective may influence the analysis process and decision making. Different analysts can make different security decisions based on their knowledge and experience and by that influence the organization's vulnerability differently. Such variability results in inconsistent remediation.

Still further, it is realized that different categories of security incidents require different response strategies. Categories of common attacks include: external media, attrition, web, email, impersonation, improper usage and loss or theft of equipment. However, there are security attacks that do not fit into any of these categories. This variation leads to difficulty in the incident management. Even an experienced analyst can come across new types of security incidents and will need to handle them in a new way.

Also, it is realized that the security analyst should take into account the organization when handling security incidents. There is currently no one mechanism to represent an organization and, as such, the incident remediation process is performed only based on the analyst's familiarity with the organization.

Illustrative embodiments overcome the above and other drawbacks of the existing manual security incident remediation approach by providing an automated system and methods for generating remediation recommendations for current (new) security incidents. For example, when a new security incident occurs, its indicators (features) and the value of the involved data assets are considered in order to recommend to the incident response team the best practice incident remediation based on historical similar incidents and, if needed, a security organizational playbook. This automated and comprehensive approach has many advantages. Examples of such advantages include, but are not limited to:

(i) The remediation recommendation process allows for easy integration of new security incidents.

(ii) The value of the data assets across the organization as well as historical incident remediation processes are considered to create accurate incident remediation recommendations.

(iii) Results are easily interpretable and provide a straightforward list of recommended remediation processes for the incident response team.

(iv) Incident response team feedback is considered in order to improve the recommender system.

In one illustrative embodiment, the incident remediation recommendation process involves several consecutive stages. These stages include: pulling new security incidents, cleaning and parsing the data, representing the organization (including the data's value to the organization), and providing a recommender system to suggest remediation processes for the incident response team, based on historical incident remediation processes and the importance of the organizational assets involved. An organizational security playbook is considered in case the remediation process of historical incidents does not adequately fit to the current incident.

FIG. 1 illustrates a system and process environment 100 for automated security incident remediation recommendation, according to an illustrative embodiment. As shown, a new security incident 102 is received by a recommender system 110. The recommender system 110 also takes as input an organizational representation 104, one or more historical security incident remediations 106, and a security (organizational) playbook 108. It is to be understood that the organizational representation 104, the one or more historical security incident remediations 106, and the security playbook 108 are represented by data stored in one or more repositories (each of 104, 106 and 108 may have a dedicated repository, or two or more may share a common repository) operatively coupled to the recommender system 110.

As will be explained in further detail below, the recommender system 110 is configured to generate a list of one or more recommended remediation processes 112 to be applied in response to the new security incident 102 based on at least part of the input data (104, 106, and 108) received. The list of one or more recommended remediation processes 112 is presented to the incident response team 114. The incident response team 114 implements at least one of the one or more recommended remediation processes, and can provide feedback 116 about the recommended remediation processes to the recommender system 110. Likewise, such feedback 116 can be made part of the data describing the one or more historical incident remediations 106.

By way of example only, organizational representation 104 may comprise information such as, but not limited to: software/hardware inventory, asset user information, asset locations, value of each data asset across the organization, and relationships between organizational assets. Organizational representation 104 will be described in further illustrative detail below in the context of FIGS. 11 and 12.

Furthermore, security incident processing is performed by the recommender system 110 (or some other system or process component in environment 100) according to illustrative embodiments and comprises extracting relevant features (e.g., feature vectors) from each security incident in order to be able to compare the new security incident 102 with historical security incidents 106. The features can be extracted from both structured and textual information.

Recommender system 110 is configured to execute a content-based recommendation approach that utilizes characteristics of a new security incident in order to recommend one or more remediation processes based on historical security incidents with similar properties. The remediation processes of those historical security incidents suggest one or more remediation recommendations for the new security incident. Value of data assets involved in the new security incident are also considered. Actions taken to protect similar-value data assets involved in historical security incidents are presented to the incident response team while handling current incidents. This allows stronger protection for systems and data.

In one or more embodiments, in case the remediation processes of any of the historical security incidents do not adequately fit to the current security incident, the security playbook 108 is taken into account to improve the recommended remediation process. As mentioned above, the playbook is a file or record that contains descriptions of generic processes for handling specific security incidents, wherein each process is divided into several degrees of response severity.

Figure 2:
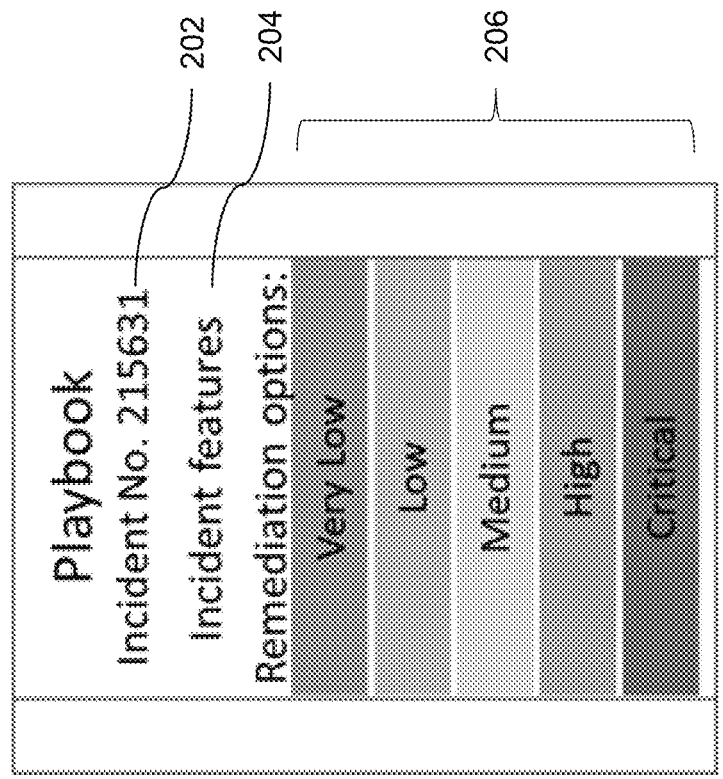
FIG. 2 illustrates an example of a security organizational playbook format used in automated security incident remediation recommendation, according to an illustrative embodiment.

FIG. 2 illustrates at least part of a security playbook with a format 200 for a security incident. Every incident in the playbook has incident number 202 (e.g., 215631 as shown in this example) and features 204 that represent or otherwise characterize properties associated with a specific security incident. Furthermore, each incident contained in the playbook typically has a plurality of remediation options 206 based on the incident severity level, e.g., critical, high, medium, low, and very low. Thus, for example, if the severity level of the incident is determined to be "medium," then the remediation process that corresponds to the medium severity level is identified and presented as the appropriate response. Note that, for the sake of simplicity of illustration, the example in FIG. 2 does not expressly list a description of the specific process associated with each severity level. However, such detailed process descriptions are part of the playbook available to the recommender system 110 and incident response team 114.

Still further, as mentioned above, the incident response team 114, after handling the new security incident, may provide feedback 116 composed of at least one of two types: (i) feedback about the similarity between listed historical security incidents and the new security incident as well as feedback about how appropriate the one or more recommended remediation processes are for the current security incident; and (ii) update the historical security incidents data (repository) 106 with the new incident and its remediation process.

Further illustrative details of the main stages of system 100 as well as other functionalities will now be described in the context of FIGS. 3-14.

Automatic Recommendation of Remediation Processes

A main advantage of the recommender system 110 is the list of one or more recommended remediation processes 112 that are automatically presented to the incident response team 114. When the incident response team 114 faces a new security incident, the team is now provided with top recommendations for remediation processes to be implemented. The list 112, provided by the recommender system 110, is based on the most similar historical security incidents and their remediation processes (from 106), as well as on the value of data assets (from 104) involved and the organization's security playbook 108.

Fast Incident Response to Minimize Potential Organizational Damage

The automation of the recommendation process allows the incident response team 114 to handle the incident efficiently and effectively. Advantageously, due to the automation provided by the recommender system 110, a security analyst for the incident response team no longer has to search for similar historical incidents and their remediation or preferred handling methodologies from the security playbook, and then decide on the best remediation. Recommender system 110 allows the analyst to respond to the incident immediately, using the remediation recommendations list 112, and thus protect the organization.

Remediation Recommendations are Incident-Customized

It is realized that a security playbook may be insufficient for incident remediation by itself. The recommender system 110 automatically provides remediation recommendations that are based on successful historical incident remediation processes and value of data involved in the current incident as well as playbook information. This combination of information allows a specific and precise recommendation for incident remediation instead of a generic process provided by the security playbook.

Automatic Creation of Recommendation List

In one or more embodiments, the automatic recommendation list of suggested remediation processes 112 generated by the recommender system 110 is based on two aspects: (i) historical security incidents that are similar to the current security incident; and (ii) the value of data assets involved in the current security incident.

The most preferred suggestions are based on a similar historical security incident (examples of similarity measures that can be used are described further below) that had the same value of data assets as the current security incident. In the case that one or more of the above two aspects is not available in the historical security incident and organizational representation repositories, a remediation process from the generic security playbook is considered. The above two aspects result in four possible scenarios, wherein each one leads to a different remediation recommendation. The four scenarios are respectively described below in the context of FIGS. 3-6.

Figure 3:
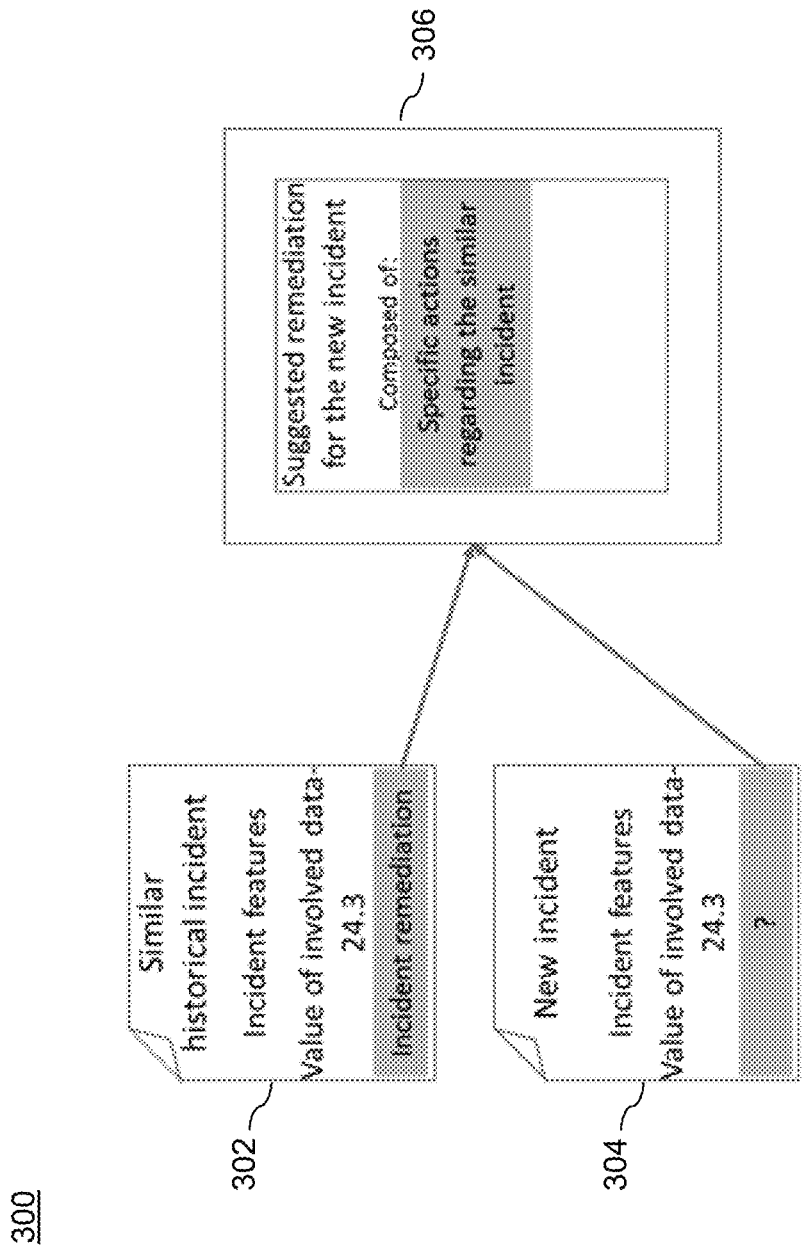
FIG. 3 illustrates an example of a remediation recommendation process, according to an illustrative embodiment.

FIG. 3 illustrates the scenario where there is at least one historical security incident similar to the current security incident (i.e., with similar incident features), and where the incidents have similar values of data assets involved. Thus, as shown in process 300, a record of a historical security incident 302 is compared with a record of a new (current) security incident 304. It is noted that the incident features are similar (which will be described in further detail below) and the data asset values for the two incidents 302 and 304 are similar (in this example, identical, with values of 24.3). Thus, the recommender system 110 generates a suggested remediation 306 for the current security incident 304 that includes similar actions to (or perhaps identical to) the remediation that was employed for the historical security incident 302.

Figure 4:
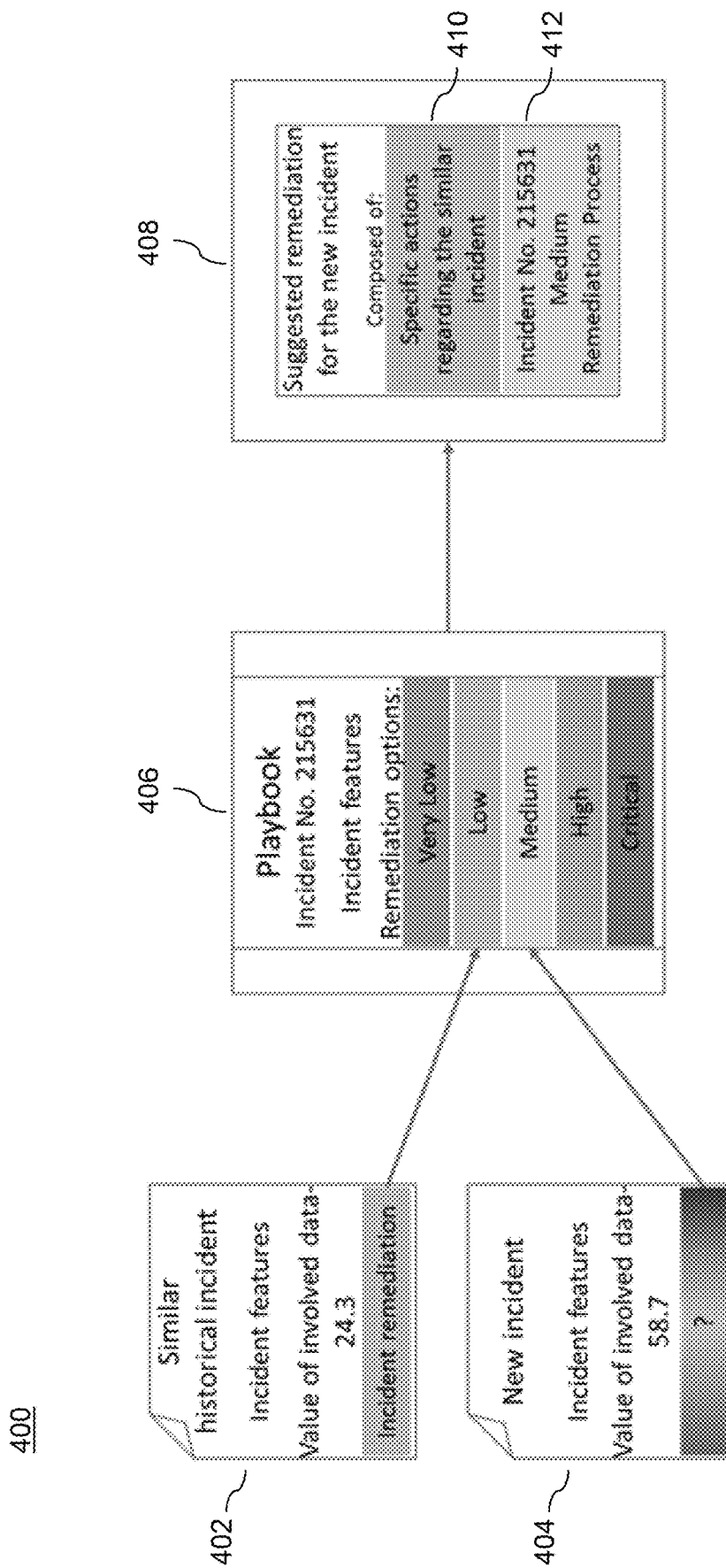
FIG. 4 illustrates another example of a remediation recommendation process, according to an illustrative embodiment.

FIG. 4 illustrates the scenario where there is at least one historical security incident similar to the current security incident (i.e., with similar incident features), but the incidents have different values of data assets involved. Thus, as shown in process 400, a record of a historical security incident 402 is compared with a record of a new (current) security incident 404. It is noted that the incident features are similar but the data asset values for the two incidents 402 and 404 are not similar (in this example, data value for the historical incident is 24.3 and data value for the current incident is 58.7). This scenario triggers consideration of a generic incident 406 from the security playbook to generate the list of recommended remediations 408.

More specifically, in this case, the remediation process of the most similar incident (specific actions 410 associated with historical incident 402) is suggested to the security response team. However, it is realized that the response severity should be different because the value of data is different, e.g., a data value of 24.3 warrants a low-level severity response, while a data value of 58.7 warrants a medium-level severity response. Thus, the generic playbook is searched using textual techniques (described in detail below) to find the remediation process of the most similar generic incident, e.g., in this case, incident no. 215631 (406). This remediation process along with the value of current incident data provides the security response team with the suggested remediation process for the new incident. Assuming the value of data is normalized to the range of 0-100, the equivalent response severity 412 will be suggested to the incident response team (e.g., 58.7—Medium). A further example for this case is presented below in the context of FIG. 13.

Figure 5:
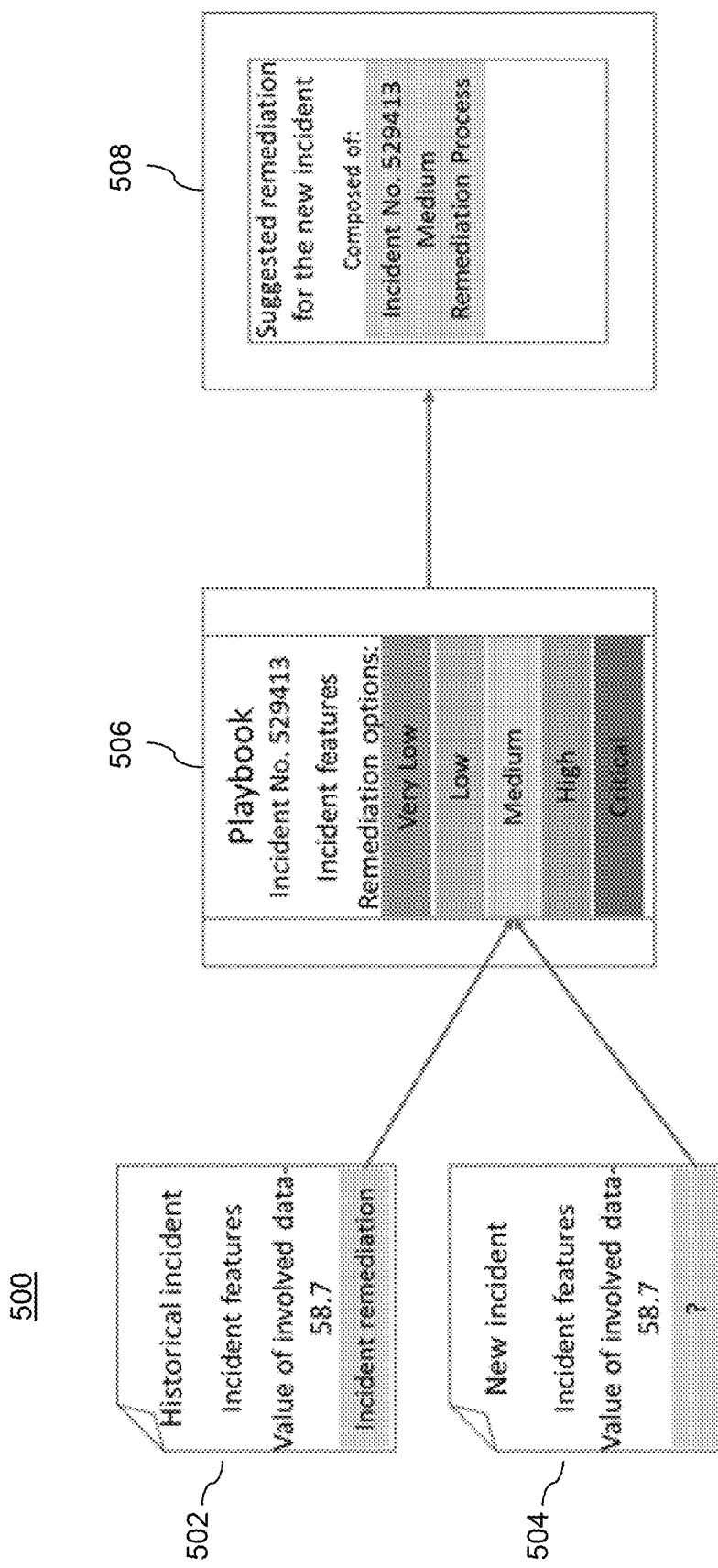
FIG. 5 illustrates a further example of a remediation recommendation process, according to an illustrative embodiment.

FIG. 5 illustrates the scenario where there is no historical security incident similar to the current security incident (i.e., with no similar incident features), but there is at least one historical incident that involved data assets with a similar data value to the data assets associated with the current incident. Thus, as shown in process 500, a record of a historical security incident 502 is compared with a record of a new (current) security incident 504. It is understood that the incident features are different but the data asset values for the two incidents 502 and 504 are similar (in this example, identical at 58.7). This scenario triggers consideration of a generic incident 506 from the security playbook to generate the list of recommended remediations 508.

More specifically, the remediation process of the incident 502 with a similar value of data is considered to determine the required severity for the current incident 504. The generic playbook is searched using the new incident features to find the incident (506) with the best suited remediation process. This remediation process along with the required severity level provides the security response team with the suggested remediation process and severity level (508) for the new incident.

Figure 6:
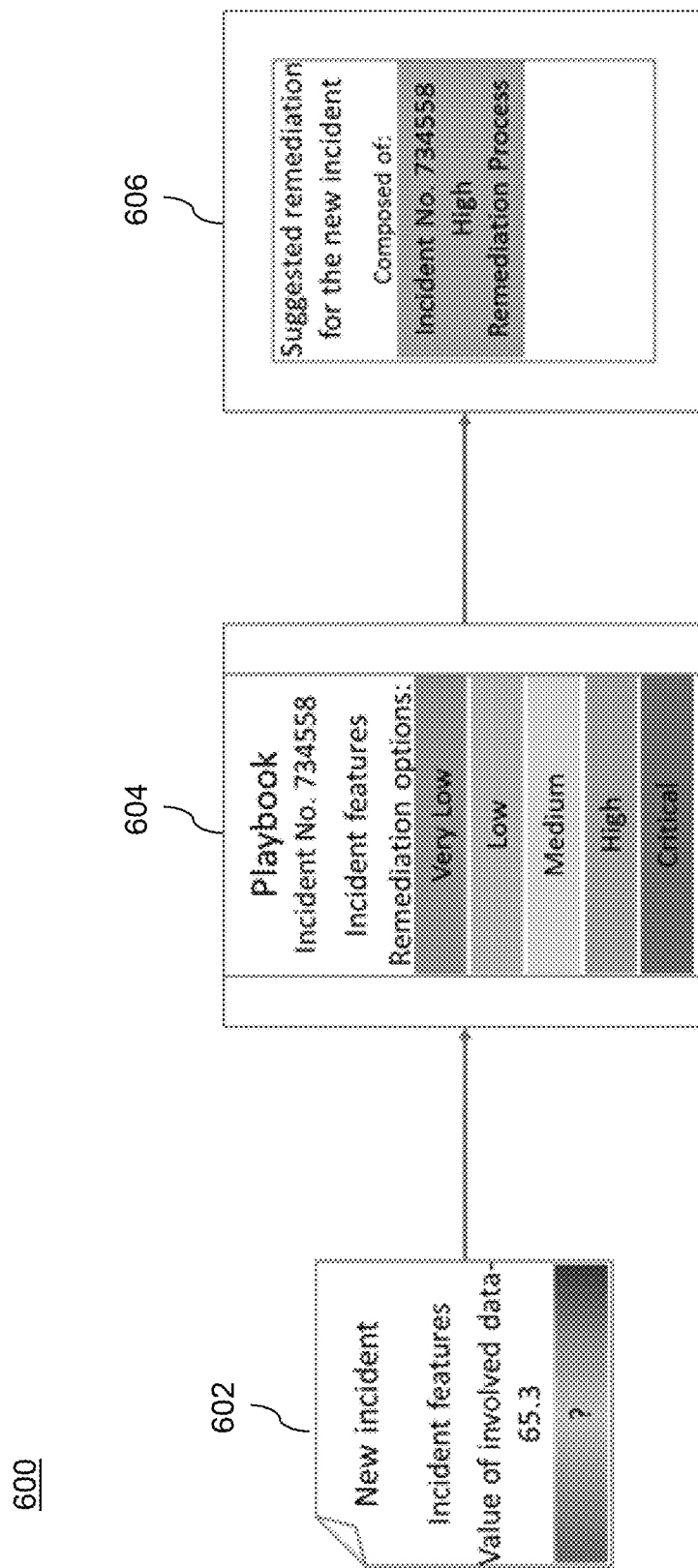
FIG. 6 illustrates yet another example of a remediation recommendation process, according to an illustrative embodiment.

FIG. 6 illustrates the scenario where there is no historical security incident similar to the current security incident (i.e., with no similar incident features), and no historical incidents with similar values of data assets involved. Thus, as shown in process 600 for a record of a new (current) security incident 602, the generic playbook is searched to find the incident (604) with the best suited remediation process. Assuming the value of data is normalized to the range of 0-100, the equivalent response severity is suggested to the incident response team, e.g., in this case, high-level severity 606 since the data value of data assets involved in the current incident is 65.3.

In one or more embodiments, the above scenarios are integrated into a single composite recommendation model utilized by the recommender system 110 that lists recommendations of preferable remediation processes (with severity levels) for a specific new security incident. It is realized that the more information about similar incidents or similar value of data that is available, the higher in preference the remediation process will be in the recommendation list.

Furthermore, it is to be appreciated that the above scenarios are composed of two comparison types:

(i) Comparing a new security incident with historical incidents or comparing a new security incident with playbook incidents. This comparison is based on structured and textual features of the incidents.

(ii) Comparing a historical security incident remediation process with a playbook's remediation processes. This comparison is textual.

Examples of both structured and textual similarity comparison methods will be explained in further detail below.

Accordingly, as the above scenarios illustrate, having historical similar incidents with similar values of data enables creation of recommended remediation processes.

The more historical organizational information exists, the more accurate and informative the recommendation list. The recommendation list facilitates the incident response team handling process, and therefore the incident handling is much faster and more accurate as compared with with existing approaches.

Data Asset Value Consideration

One main advantage of the automated security incident remediation recommendation approach according to illustrative embodiments is the use of a data valuation metric for each organizational asset.

Recent research into the economic value or business priority of data has resulted in different approaches for measuring and storing specific numeric metadata (e.g., either currency amounts or relative rankings) alongside of corporate data assets. Data valuation metadata can then be used for a variety of business purposes (e.g., beginning to treat data as a balance sheet asset).

Note that any number of valuation scores may be assigned to a data set, such as an economic cost (e.g. a dollar or euro amount), the intrinsic value (IVI), the business value (BVI), etc. Additional valuation metadata can result in richer and more accurate security threat prioritization.

Figure 7:
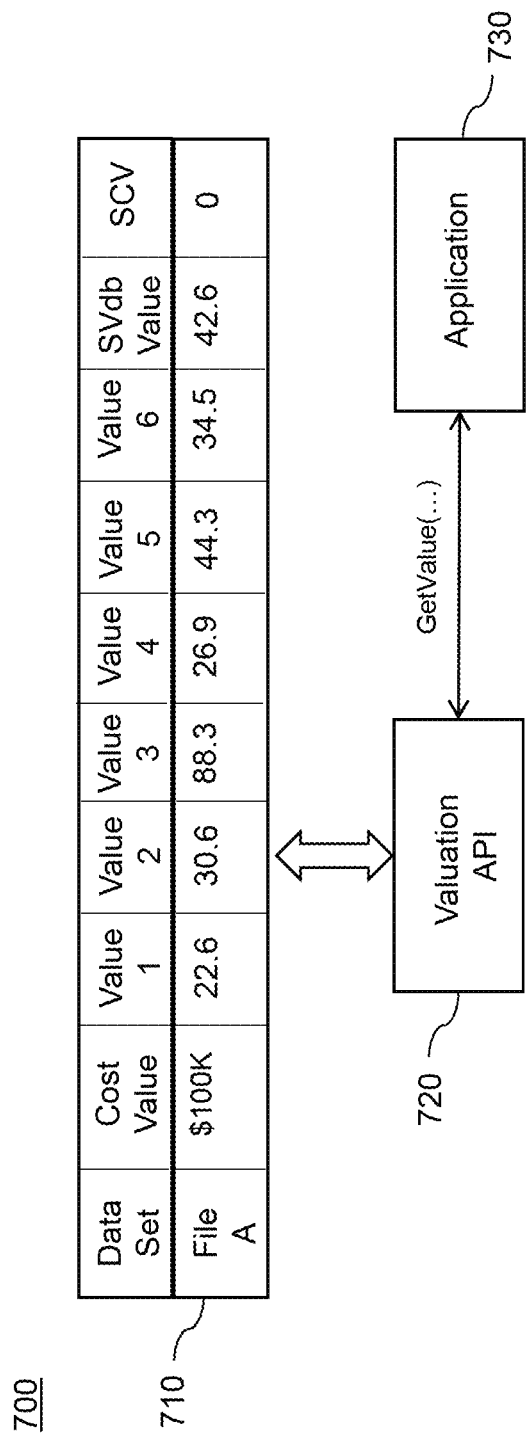
FIG. 7 illustrates an example of a data valuation table utilized by a system and process for automated security incident remediation recommendation, according to an illustrative embodiment.

As illustrated in methodology 700 in FIG. 7, a valuation table 710 represents a table stored for file A (i.e., an organizational asset or data asset). Table 710 shows illustrative values computed for a set of data valuation algorithms (i.e., value 1 is an output value that corresponds to a first valuation algorithm, value 2 is an output value that corresponds to a second valuation algorithm, and so on). Also shown is a cost value which represents a cost to the organization associated with obtaining file A (e.g., purchase cost). Note that one or more of the valuation algorithms can implement valuation criteria that are standard for and/or required by a specific industry. Advantageously, table 710 also includes an SVdb (streaming valuation database) value that corresponds to a valuation algorithm executed on file A at the time of ingest of file A to the information processing system of the organization. Table 710 may also include an SCV (streaming correlation valuation) value which indicates a correlation between file A and some other organizational asset (e.g., file C). Thus, if the SCV value is zero (as illustratively shown), this means that the content of file C has no correlation with respect to file A.

As further shown, a valuation application programming interface (API) 720 can fetch a value for file A based on a query from an application 730. In illustrative embodiments, the application 730 may be the recommender system 100 (or one or more of its components) which fetches or otherwise obtains one or more data values for file A from table 710 for use in security incident ranking operations.

By way of example only, valuation algorithms used to generate one or more of the data values illustrated in table 710 may comprise, but are not limited to:

(i) unstructured tokenization algorithms (UTA) described in U.S. patent application Ser. No. 14/863,783, filed Sep. 24, 2015, entitled "Unstructured Data Valuation," the disclosure of which is incorporated herein in its entirety;

(ii) application development and deployment velocity valuation algorithms described in U.S. patent application Ser. No. 14/998,112, filed Dec. 24, 2015, entitled "Data Valuation Based on Development and Deployment Velocity," the disclosure of which is incorporated herein in its entirety;

(iii) data ingest valuation algorithms described in U.S. patent application Ser. No. 15/135,790, filed Apr. 22, 2016, entitled "Data Valuation at Content Ingest," the disclosure of which is incorporated herein in its entirety;

(iv) data value tree generation techniques described in U.S. patent application Ser. No. 15/135,817, filed Apr. 22, 2016, entitled "Data Value Structures," the disclosure of which is incorporated herein in its entirety; and (v) valuation algorithms based on analysis of a backup and recovery ecosystem described in U.S. patent application Ser. No. 15/136,327, filed Apr. 22, 2016, entitled "Calculating Data Value via Data Protection Analytics," the disclosure of which is incorporated herein in its entirety.

It is to be appreciated that the above valuation processes are intended to be examples only, and thus other valuation algorithms and techniques can be used in alternative embodiments. One additional non-limiting example includes a business value of information (BVI) metric which takes into account the relevance of one or more business units of an organization that uses a given data asset.

It is also to be appreciated that while such valuation processes may be applied to data sets associated with the organization, the valuation techniques can also be applied to other assets related to data of the organization including, but not limited to, applications, services, etc.

Accordingly, by way of example, as a new security incident 102 flows into system and process environment 100, the following steps are executed to calculate value:

(i) Data assets relevant to the security incident are discovered (e.g., this security incident is relevant to "File A").

(ii) The value of relevant data assets is fetched from the valuation ecosystem (e.g., valuation table 710) and fed into the security algorithm.

(iii) If the valuation is "unknown" or "uninitialized," a number of different approaches can be used, by way of example: (a) data value is calculated on the fly (in real time or near real time) by one or more of the valuation algorithms described above or by some other system or method; or (b) data value is defaulted to "critical" to gain the attention of the security analyst, and motivate the organization to address unvalued assets.

Valuation Weights for Incident Remediation

Table 1 below highlights a data value incident weighting approach that can assist in the incident remediation process, in accordance with one or more embodiments.

TABLE 1

| Data Element | Relevance | Validity | Completeness | Timeliness | BVI |
|---|---|---|---|---|---|
| Customer Address | 3.4 | 0.8 | 0.9 | 0.8 | 1.96 |
| (Incident Weighting) | 2 | 1 | 1 | 1 | |

The table above further highlights that a field known as "Customer Address" has been assigned a business value (BVI) of "1.96". BVI is computed by mathematically combining together four different data characteristics: relevance, validity, completeness, and timeliness. The table is augmented by assigning "incident weights" to each valuation input. In Table 1, it is specified that the "relevance" field (a scoring of the importance of this data asset across multiple business units) is significantly more important (twice as much) to incident remediation than the rest of the fields.

These weights result in new valuation scores that are specifically targeted towards incident remediation. These weights can be applied against specific data assets (e.g., "Customer Address") or they can be applied evenly against all data assets.

It is to be appreciated that such weights can be applied to the data values of table 710 and accessible through valuation API 720 by the recommender system 110.

Structured and Textual Information Consideration

There are two instances that are analyzed for the remediation recommendation techniques described herein, i.e., security incident and remediation process. As mentioned above, the remediation process features are textual while the security incident features are structured and/or textual.

The structured features can be binary features such as indicators and observables or categorical such as TTPs ("Tactics, Techniques and Procedures" related to an incident, as well as other incident characteristics mentioned below in the context of FIG. 10). For example, the textual information can be the title, description and any other textual information describing an incident or remediation process.

In one or more embodiments, the recommender system 110 is based on similarity measures. Both structured and textual information about the incidents or the remediation processes are used to create a feature vector for each instance. These feature vectors are compared using similarity measures to find similarity between new and historical incidents or similarity between the playbook and historical incident remediation processes.

Figure 8:
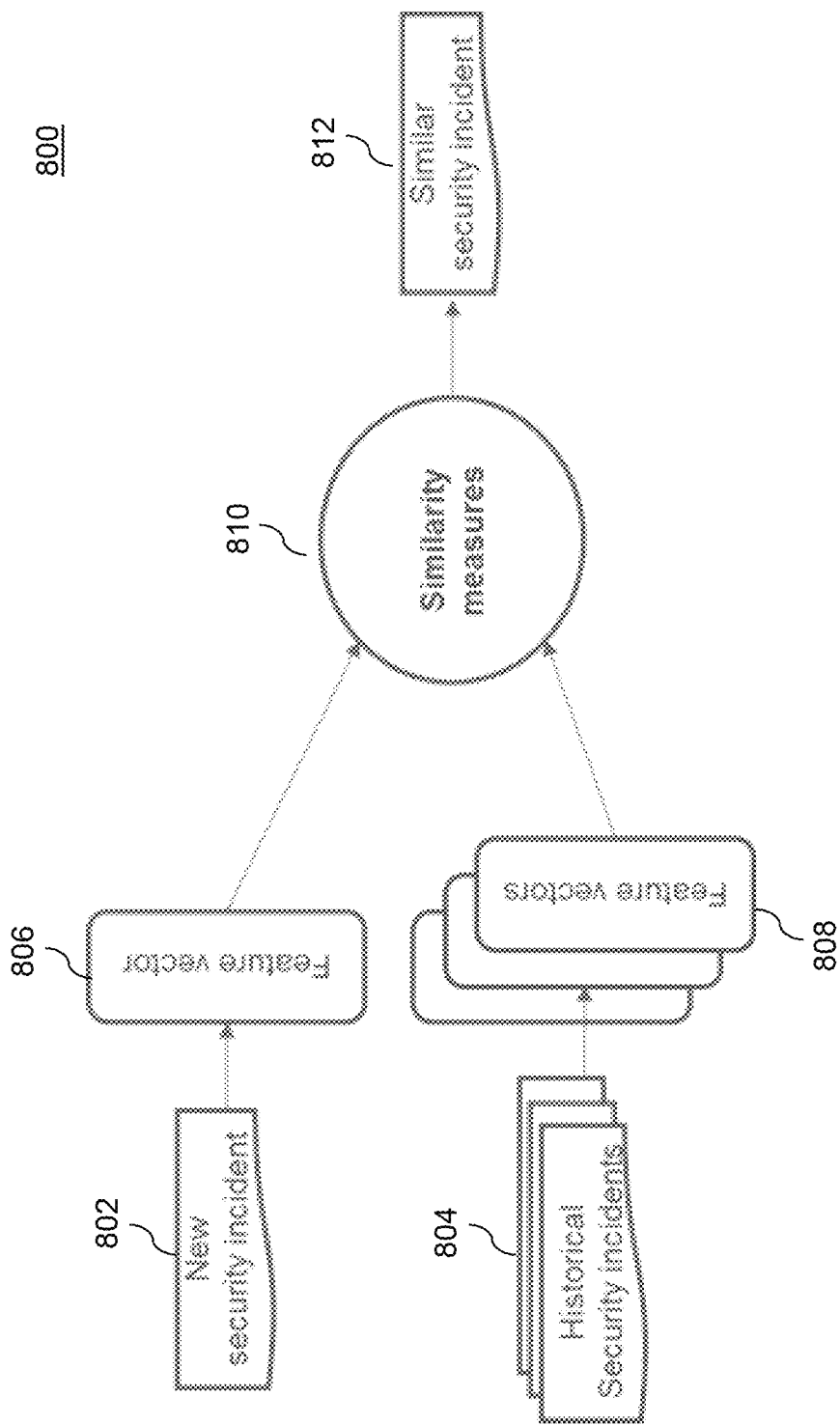
FIG. 8 illustrates a security incident similarity calculation process for automated security incident remediation recommendation, according to an illustrative embodiment.

FIG. 8 illustrates a process flow chart that is suitable for all instances (i.e., security incidents and remediation processes). As illustrated, process 800 receives, as input, (i) a new security incident 802; and (ii) one or more historical security incidents 804. A feature vector 806 representing the new security incident 802 is extracted, as are one or more feature vectors 808 from the one or more historical security incidents 804. The feature vector 806 and one or more feature vectors 808 are fed into a similarity measure algorithm 810 and compared (i.e., feature vector 806 is compared to each of the feature vectors 808) to determine which, if any, of the historical security incidents 804 are similar to the new security incident 802. As shown in FIG. 8, one of the historical security instances 804 is identified as a similar security incident 812 based on the similarity measure algorithm 810.

In one or more embodiments, each above-mentioned feature vector is based on at least one of two feature types: (i) structured features; and (ii) textual features whereby text analytics techniques (e.g., term frequency-inverse document frequency or TF-IDF, bag of words) are used in order to extract features from the textual information of each incident or remediation process.

The feature vectors are then compared using one or more similarity measure algorithms (e.g., Pearson correlation, cosine similarity). Every pair of feature vectors receives a similarity score. Incidents or remediation processes that receive similarity scores higher than a predetermined threshold are chosen as a "similar incident" or a "similar remediation process." The most similar incidents and most similar remediation processes are fed into the processes described above in the context of FIGS. 3-6.

Incident Response Team Feedback Consideration

Figure 9:
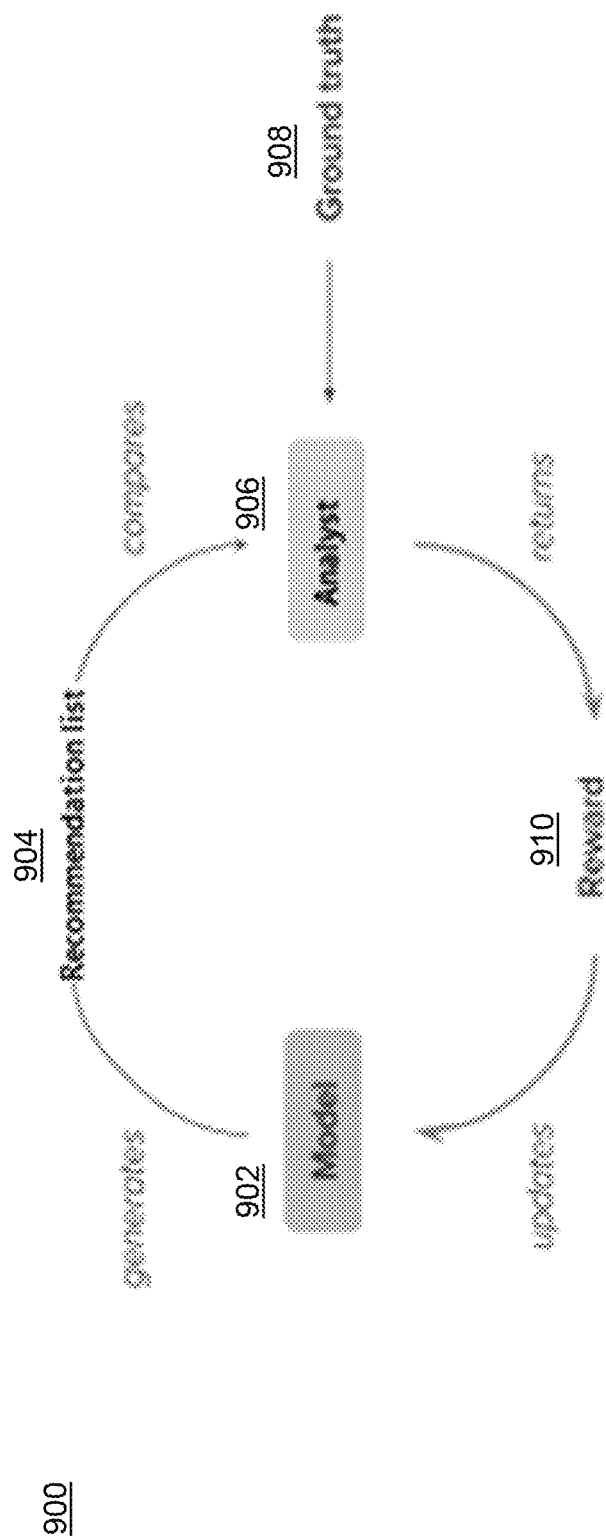
FIG. 9 illustrates an example of reinforcement learning used in automated security incident remediation recommendation, according to an illustrative embodiment.

In one or more embodiments, the recommendation model used by the recommender system 110 is trained and improved using the incident response team feedback and reinforcement learning as illustrated in FIG. 9.

Initially, as shown in reinforcement learning algorithm 900, the recommendation model 902 generate its own recommendation list 904. Then, the security analyst 906 (part of the incident response team) compares the generated recommendation list against his "Ground truth" 908 which relies on the analyst's expertise. This feedback then indicates to the model 902 how "good" the generated list was. If the score is high, then the model 902 can update itself to make sure such recommendations are more likely to appear in the future. Otherwise, if the score is low, the model 902 gets penalized and changes its generation procedure to prevent similar recommendations. These rewards 910 are considered when updating weight values of the machine learning model.

Automatic and Content-Based Security Incident Analysis

Existing security incidents analysis is done end-to-end by individuals. Therefore, the process is biased and depends on the analyst that handles the incidents and his expertise. Illustrative embodiments support responding to incidents systematically (i.e., following a consistent incident remediation methodology) so that the appropriate actions are taken. Further, illustrative embodiments are based on the content of historical and current incidents to recommend one or more remediation processes and therefore reduce the dependency between the remediation process chosen and the analyst who handles the incident. The security incidents can be analyzed to extract their characteristics using a Structured Threat Information eXpression (STIX) format. Table 1000 in FIG. 10 illustrates important incident categories (left hand column) and their characteristics (right hand column) that are extracted and used for remediation recommendation operations as described herein.

Each category has internal schema which specifies it in detail. For example, the "impact assessment" feature contains a written summary as well as a severity score determined by the responder analyst. The "affected assets" feature contains a list of the affected assets and their types, values of data, etc.

Figure 13:
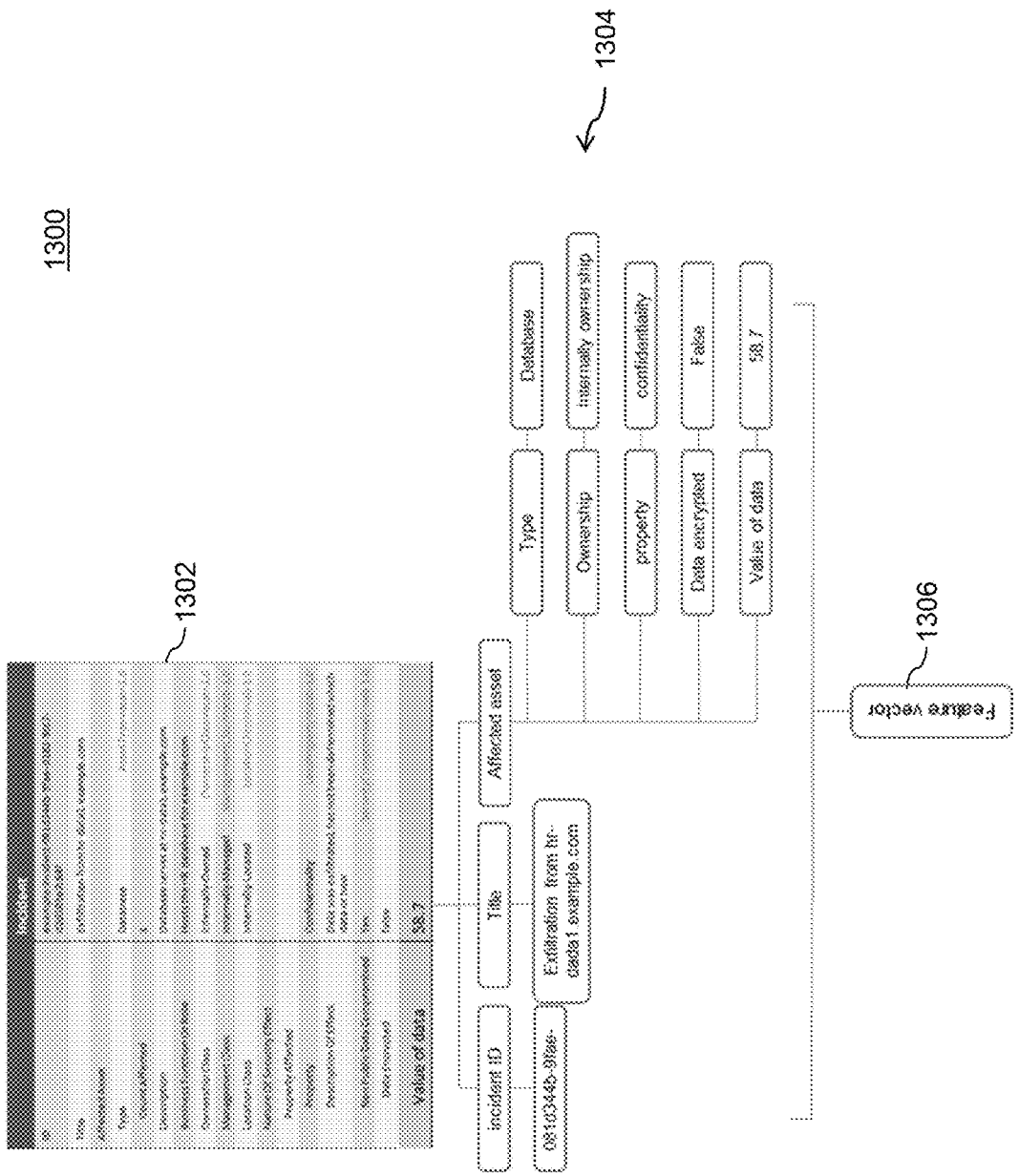
FIG. 13 illustrates an example of a security incident and its features, according to an illustrative embodiment.

An example of a security incident and its possible categorical features is described below in FIG. 13.

Organizational Representation

Figure 11:
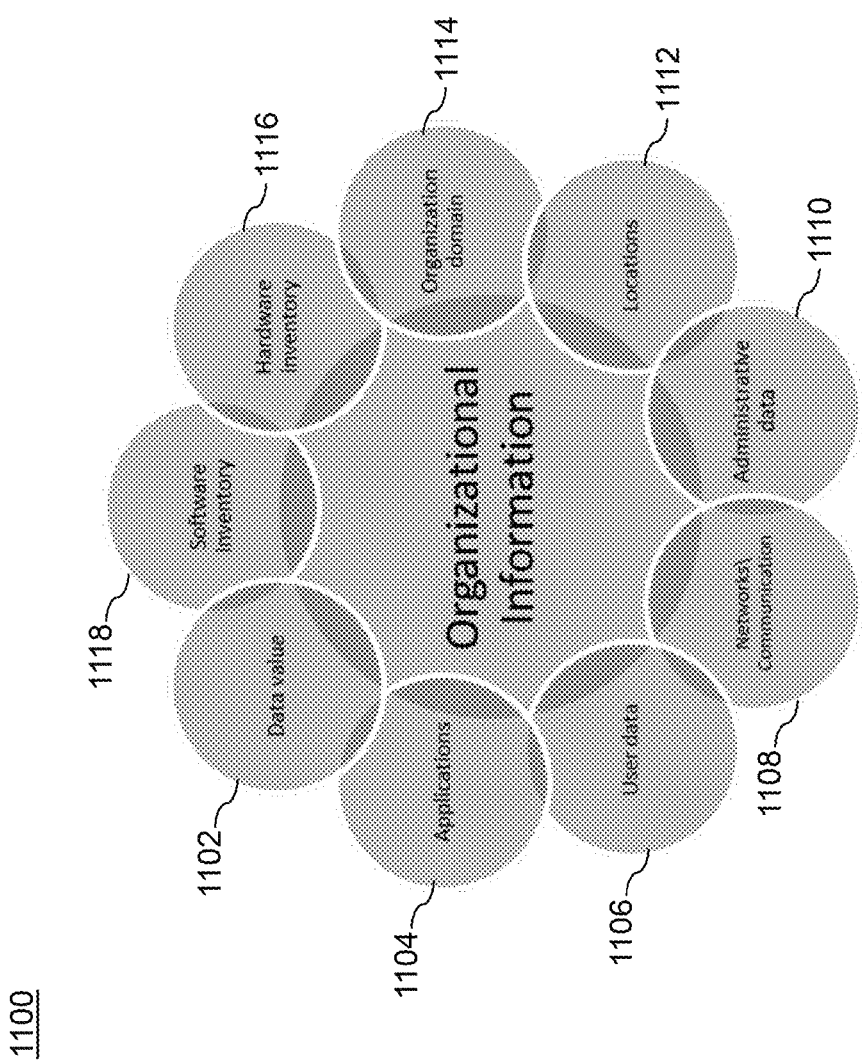
FIG. 11 illustrates an example of a graphical representation of organizational information utilized by a system and process for automated security incident remediation recommendation, according to an illustrative embodiment.

Illustrative embodiments realize that in order to determine the remediation recommendations for each security incident, a complete (or as close to complete as possible) representation of the organization and its assets should be considered. FIG. 11 represents the organizational information taken into account (as organizational representation 104) to determine the recommended remediation of a security incident. To obtain a complete representation, each asset across the organization should be represented by this information.

Thus, as shown, organizational information 1100 may comprise, but not be limited to, data value 1102, applications 1104, user data 1106, networks/communication 1108, administrative data 1110, locations 1112, organization domain 1114, hardware inventory 1116, and software inventory 1118.

An example of organizational information (considered as another example of organizational representation 104) in the form of a JavaScript Object Notation (JSON) file 1200 is shown in FIG. 12. In an illustrative embodiment, file 1200 contains all the information 1100 mentioned above for each asset in the organization.

The organizational representation is important when choosing the recommended remediation process. When different security incidents affect the same organizational assets, or assets sharing the same data value, the remediation process might be similar in the sense of actions taken to protect those assets.

Illustrative Example

As explained above, a security incident can contain information about the set of organizational assets that were affected in the course of that incident. For example, this information allows understanding of the impact of a particular incident on the information technology (IT) assets that it affected and the business functions that are supported by that IT assets. In accordance with one or more illustrative embodiments, this information is taken into account to calculate the remediation recommendation for the security incident. One non-limiting example of a specific format for information about a given security incident is the above-mentioned STIX format.

When a new security incident occurs, it is first analyzed to extract its important information and create a feature vector that represents the incident. Feature vector extraction 1300 is illustrated in FIG. 13. As shown, a new security incident is represented by information table 1302. Features 1304 are extracted from the information table 1302. The features 1304 are represented by feature vector 1306 used in the recommendation process.

A feature vector is similarly calculated for all past incidents. The feature vectors are then fed into a similarity measure algorithm (e.g., 810 in FIG. 8) to determine the similarity measure between the current incident and all historical incidents. The most similar historical incidents are analyzed to determine the recommended remediation processes. By way of example only, using process 400 described above in the context of FIG. 4, recall that the value of data of the new incident is 58.7 (as depicted in table 1302). The value of data of the most similar incident is 24.3. This means that the recommended remediation process for the new incident cannot be exactly the same, i.e., since the response severity should be different. Therefore, the security playbook is searched using textual techniques to find the remediation process of the most similar incident. After the remediation process of the past incident is found in the playbook, the more severe remediation process of the same playbook incident is recommended for the incident response. In this example, the remediation process severity of the past similar incident is "Low," therefore the remediation process suggestions will be "Medium" or "High" severity. It will not be critical because the difference between current and past incidents value of data is not large and it is assumed that the value of data is normalized to the range of 0-100. A data value of 58.7 is equivalent to "Medium" severity, therefore the recommender system 110 recommends a remediation process of "Medium" severity.

At least portions of the automated system and methods for generating one or more remediation recommendations for security incidents shown in FIGS. 1-13 may be implemented using one or more processing platforms associated with one or more information processing systems. In some embodiments, a given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one. In many embodiments, logic may be executed across one or more physical or virtual processors. In certain embodiments, a virtual processor may be mapped to and executed on or across a portion of one or more virtual or physical processors.

As is apparent from the above, one or more of the processing modules or other components of the automated system and method for generating one or more remediation recommendations for security incidents shown in FIGS. 1-13 may each run on a computer, server, storage device or other processing platform element. A given such element may be viewed as an example of what is more generally referred to herein as a "processing device." An example of such a processing platform is processing platform 1400 shown in FIG. 14.

The processing platform 1400 in this embodiment comprises a plurality of processing devices, denoted 1402-1, 1402-2, 1402-3, . . . 1402-N, which communicate with one another over a network 1404.

The network 1404 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Some networks utilized in a given embodiment may comprise high-speed local networks in which associated processing devices communicate with one another utilizing Peripheral Component Interconnect Express (PCIe) cards of those devices, and networking protocols such as InfiniBand, Gigabit Ethernet or Fibre Channel.

The processing device 1402-1 in the processing platform 1400 comprises a processor 1410 coupled to a memory 1412.

The processor 1410 may comprise a microprocessor, a microcontroller, an application-specific integrated circuit (ASIC), a field-programmable gate array (FPGA) or other type of processing circuitry, as well as portions or combinations of such circuitry elements.

The memory 1412 may comprise random access memory (RAM), read-only memory (ROM) or other types of memory, in any combination. The memory 1412 and other memories disclosed herein should be viewed as illustrative examples of what are more generally referred to as "processor-readable storage media" storing executable program code of one or more software programs.

Articles of manufacture comprising such processor-readable storage media are considered embodiments of the present disclosure. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1402-1 of the example embodiment of FIG. 14 is network interface circuitry 1414, which is used to interface the processing device with the network 1404 and other system components, and may comprise conventional transceivers.

The other processing devices 1402 of the processing platform 1400 are assumed to be configured in a manner similar to that shown for processing device 1402-1 in the figure.

Again, this particular processing platform is presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the disclosure can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment, although in other embodiments a given tenant can have multiple containers. The containers may be utilized to implement a variety of different types of functionality within the system. For example, containers can be used to implement respective cloud compute nodes or cloud storage nodes of a cloud computing and storage system. The compute nodes or storage nodes may be associated with respective cloud tenants of a multi-tenant environment. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC. For example, portions of a system of the type disclosed herein can be implemented utilizing converged infrastructure.

It should therefore be understood that in other embodiments different arrangements of additional or alternative elements may be used. In many embodiments, at least a subset of these elements may be collectively implemented on a common processing platform, or each such element may be implemented on a separate processing platform.

Also, in other embodiments, numerous other arrangements of computers, servers, storage devices or other components are possible in the system and methods described herein. Such components can communicate with other elements of the system over any type of network or other communication media.

As indicated previously, in some embodiments, components of the automated system and method as disclosed herein can be implemented at least in part in the form of one or more software programs stored in memory and executed by a processor of a processing device. For example, at least portions of the execution environment or other system components are illustratively implemented in one or more embodiments the form of software running on a processing platform comprising one or more processing devices.

It should again be emphasized that the above-described embodiments of the disclosure are presented for purposes of illustration only. Many variations and other alternative embodiments may be used. For example, the disclosed techniques are applicable to a wide variety of other types of security incidents. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the embodiments. Numerous other alternative embodiments within the scope of the appended claims will be readily apparent to those skilled in the art.

What is claimed is:

1. A method comprising:
obtaining at least one security incident indicative of at least one security event that may impact or has impacted one or more assets associated with an organization; and
automatically generating a remediation recommendation for the security incident based on: (i) one or more remediation processes associated with historical security incident data of one or more security incidents that precede the at least one security incident in time; and (ii) one or more values attributed to the one or more assets of the organization;
causing presentation of the remediation recommendation for the at least one security incident to at least one security incident responder to implement the remediation recommendation;
receiving feedback data from the at least one security incident responder, the feedback data representative of: (i) identifying similarities between the at least one security incident and the one or more security incidents that precede the at least one security incident in time; and (ii) determining a level of appropriateness of the one or more remediation processes of the remediation recommendation generated for the at least one security incident;
storing the feedback data of the one or more remediation processes of the implemented remediation recommendation with the one or more security incidents that precede the at least one security incident in time; and
updating the historical security incident data with the at least one security incident and the feedback data;
wherein the step of automatically generating a remediation recommendation for the security incident is further based at least in part on a set of generic remediation processes maintained by the organization;
wherein the step of automatically generating a remediation recommendation for the security incident further comprises comparing: (i) one or more features associated with the at least one security event with one or more features associated with each of the one or more security incidents that precede the at least one security incident in time; and (ii) a data value associated with the at least one security event with one or more data values associated with each of the one or more security incidents that precede the at least one security incident in time;
wherein comparing one or more features further comprises comparing similarity between structural features and comparing similarity between textual features; and
wherein the above steps are executed by at least one processing device comprising a processor operatively coupled to a memory.

2. The method of claim 1, further comprising using the updated historical security incident data for generating at least one subsequent remediation recommendation.

3. The method of claim 1, wherein:
when the comparing steps indicate that the one or more features and the data value of the at least one security incident are similar to the one or more features and the data value of one of the one or more security incidents that precede the at least one security incident in time;
the remediation recommendation comprises one or more specific actions taken in response to a similar preceding security incident with a severity level corresponding to the similar preceding security incident.

4. The method of claim 1, wherein:
when the comparing steps indicate that the one or more features of the at least one security incident are similar to the one or more features of one of the one or more security incidents that precede the at least one security incident in time but the data value of the at least one security incident is different than the data value of the preceding security incident;
the remediation recommendation comprises one or more specific actions taken in response to the similar preceding security incident with a severity level corresponding to a remediation process of a similar security incident found in the set of generic remediation processes.

5. The method of claim 4 further comprising executing a text search of the historical security incident data to identify the remediation process of the similar security incident.

6. The method of claim 1, wherein:
when the comparing steps indicate that the data value of the at least one security incident is similar to the data value of one of the one or more security incidents that precede the at least one security incident in time but the one or more features of the at least one security incident are different than the one or more features of the preceding security incident;
the remediation recommendation comprises one or more specific actions associated with a similar security incident found in the set of generic remediation processes with a severity level corresponding to a remediation process of the similar preceding security incident.

7. The method of claim 1, wherein:
when the comparing steps indicate that the one or more features and the data value of the at least one security incident are different than the one or more features and the data value of each of the one or more security incidents that precede the at least one security incident in time;
the remediation recommendation comprises one or more specific actions and the severity level associated with a similar security incident found in the set of generic remediation processes.

8. The method of claim 1, wherein the comparing step comprises use of at least one similarity measure.

9. The method of claim 1, wherein the step of automatically generating the remediation recommendation further comprises applying a reinforcement learning algorithm on a recommendation model used to generate the remediation recommendation of the at least one security incident.

10. The method of claim 1, wherein the one or more values attributed to the one or more assets of the organization are computed by one or more valuation algorithms.

11. The method of claim 1, wherein the one or more values attributed to the one or more assets of the organization are weighted based on security incident remediation criteria.

12. The method of claim 1, wherein the step of automatically generating a remediation recommendation for the security incident is further based on a representation of information of the one or more assets of the organization.

13. The method of claim 1, wherein the at least one security incident is reported via a security information and event management tool.

14. The method of claim 1, further including:
extracting an incident feature vector representative of the at least one security incident;
extracting one or more historical feature vectors representative of the one or more security incidents that precede the at least one security incident in time; and
comparing the incident feature vector with the one or more historical feature vectors to determine if the at least one security incident is similar to the one or more security incidents that precede the at least one security incident in time;
wherein the incident feature vector and the one or more historical feature vectors each comprise structural and textual features.

15. A system comprising:
at least one processor, coupled to a memory, and configured to:
obtain at least one security incident indicative of at least one security event that may impact or has impacted one or more assets associated with an organization;
automatically generate a remediation recommendation for the security incident based on: (i) one or more remediation processes associated with historical security incident data of one or more security incidents that precede the at least one security incident in time; and (ii) one or more values attributed to the one or more assets of the organization;
cause presentation of the remediation recommendation for the at least one security incident to at least one security incident responder to implement the remediation recommendation;
receive feedback data from the at least one security incident responder, the feedback data representative of: (i) identifying similarities between the at least one security incident and the one or more security incidents that precede the at least one security incident in time; and (ii) determining a level of appropriateness of the one or more remediation processes of the remediation recommendation generated for the at least one security incident;
store the feedback data of the one or more remediation processes of the implemented remediation recommendation with the one or more security incidents that precede the at least one security incident in time; and
update the historical security incident data with data representative of the at least one security incident and the feedback data;
wherein automatically generating a remediation recommendation for the security incident is further based at least in part on a set of generic remediation processes maintained by the organization;
wherein automatically generating a remediation recommendation for the security incident further comprises comparing: (i) one or more features associated with the at least one security event with one or more features associated with each of the one or more security incidents that precede the at least one security incident in time; and (ii) a data value associated with the at least one security event with one or more data values associated with each of the one or more security incidents that precede the at least one security incident in time;
wherein comparing one or more features further comprises comparing similarity between structural features and comparing similarity between textual features.

16. The system of claim 15, wherein the at least one processor if further configured to:
extract an incident feature vector representative of the at least one security incident;

extract one or more historical feature vectors representative of the one or more security incidents that precede the at least one security incident in time; and compare the incident feature vector with the one or more historical feature vectors to determine if the at least one security incident is similar to the one or more security incidents that precede the at least one security incident in time;

wherein the incident feature vector and the one or more historical feature vectors each comprise structural and textual features.

17. The system of claim 15, wherein:

when comparing indicates that the one or more features of the at least one security incident are similar to the one or more features of one of the one or more security incidents that precede the at least one security incident in time but the data value of the at least one security incident is different than the data value of the preceding security incident, the remediation recommendation comprises one or more specific actions taken in response to the similar preceding security incident with a severity level corresponding to a remediation process of a similar security incident found in the set of generic remediation processes; and wherein the at least one processor if further configured to: execute a text search of the historical security incident data to identify the remediation process of the similar security incident.

18. An article of manufacture comprising a non-transitory processor-readable storage medium having stored therein program code of one or more software programs, wherein the program code when executed by at least one processing device causes said at least one processing device to:

obtain at least one security incident indicative of at least one security event that may impact or has impacted one or more assets associated with an organization;

automatically generate a remediation recommendation for the security incident based on: (i) one or more remediation processes associated with historical security incident data of one or more security incidents that precede the at least one security incident in time; and (ii) one or more values attributed to the one or more assets of the organization;

cause the presentation of the remediation recommendation for the at least one security incident to at least one security incident responder to implement the remediation recommendation;

receive feedback data from the at least one security incident responder, the feedback data representative of: (i) identifying similarities between the at least one security incident and the one or more security incidents that precede the at least one security incident in time; and (ii) determining a level of appropriateness of the one or more remediation processes of the remediation recommendation generated for the at least one security incident;

store the feedback data of the one or more remediation processes of the implemented remediation recommendation with the one or more security incidents that precede the at least one security incident in time; and update the historical security incident data with data representative of the at least one security incident and the feedback data;

wherein automatically generating a remediation recommendation for the security incident is further based at least in part on a set of generic remediation processes maintained by the organization;

wherein automatically generating a remediation recommendation for the security incident further comprises comparing: (i) one or more features associated with the at least one security event with one or more features associated with each of the one or more security incidents that precede the at least one security incident in time; and (ii) a data value associated with the at least one security event with one or more data values associated with each of the one or more security incidents that precede the at least one security incident in time;

wherein comparing one or more features further comprises comparing similarity between structural features and comparing similarity between textual features.

19. The article of manufacture of claim 18, wherein the program code when executed by at least one processing device causes said at least one processing device to:

extract an incident feature vector representative of the at least one security incident; and extract one or more historical feature vectors representative of the one or more security incidents that precede the at least one security incident in time; and compare the incident feature vector with the one or more historical feature vectors to determine if the at least one security incident is similar to the one or more security incidents that precede the at least one security incident in time;

wherein the incident feature vector and the one or more historical feature vectors each comprise structural and textual features.

20. The article of manufacture of claim 18, wherein:

when comparing indicates that the one or more features of the at least one security incident are similar to the one or more features of one of the one or more security incidents that precede the at least one security incident in time but the data value of the at least one security incident is different than the data value of the preceding security incident, the remediation recommendation comprises one or more specific actions taken in response to the similar preceding security incident with a severity level corresponding to a remediation process of a similar security incident found in the set of generic remediation processes; and wherein the program code when executed by at least one processing device causes said at least one processing device further to:

execute a text search of the historical security incident data to identify the remediation process of the similar security incident.

\* \* \* \* \*